United States Patent Office 3,574,858
Patented Apr. 13, 1971

3,574,858
MICROBIOCIDE FOR CONTROLLING BACTERIA IN WATER
Gert P. Volpp, Princeton, N.J., assignor to FMC Corporation, New York, N.Y.
No Drawing. Filed July 9, 1968, Ser. No. 743,296
Int. Cl. A01n 9/12
U.S. Cl. 424—324                           6 Claims

ABSTRACT OF THE DISCLOSURE

Slime formation in paper pulp is controlled by adding to pulp liquors a compound of the formula

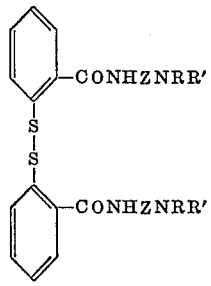

wherein each of R and R' represent lower alkyl groups and Z is an alkylene group of 2 to 7 carbon atoms.

BACKGROUND OF THE INVENTION

A.—Field of the invention

This invention relates to improvements in the control of bacteria in water, particularly in wood and paper pulp liquors by treating them with certain bactericidal compounds.

B.—Discussion of the prior art

The control of waterborne bacteria is essential in numerous commercial operations and processes. In the paper industry, bacteria are responsible for the buildup of slime in the pulp liquors and constitutes a problem for which no entirely satisfactory solution has been found. For instance, when wood pulp is suspended in water during the numerous processing steps necessary for the conversion to finished pulp and paper products, some of the bacteria ordinarily present intermix with the process pulp. On drying, this slime or bacteria may leave discoloration, holes, thin spots and accumulations of dirt in the product, which not only ruin its general appearance, but cause deterioration in its quality and properties. Moreover, the presence of bacteria results in operating difficulties during the drying procedures. These are often manifested by the breaking of the partially dried sheet on the drying rolls, thereby causing lost time on the drying machines, as well as the added expense of recovering the partially processed materials. Although always of great concern to paper makers, the problem of slime control has been compounded of late by the trend to water recirculation in an effort to comply with the antipollution laws. When the processing liquors or water are recirculated, there results a gradual buildup of the bacteria over a period of time, so that eventually normal operations are seriously hampered.

Numerous remedies have been proposed for dealing with the problem of slime formation in paper pulp. Generally such proposals advocate the addition of various toxic substances to the processing waters for the purpose of inhibiting bacteria growth and thereby cutting down on the quantity of slime formation. Among such additives which have heretofore been proposed are chlorine; organic and inorganic salts of copper and silver, such as the napthenates and sulfates; organic mercurials, such as phenyl mercuric acetate; chlorinated phenolic compounds such as sodium pentachlorophenate as well as others.

However, none of the materials have been thus far entirely satisfactory, for one reason or another. For instance, chlorine when present in sufficient concentration to prevent growth tends to be corrosive to equipment and irritating to the skin and eyes of persons exposed to the water. Nor are the various organic and inorganic salts always effective and many are unsatisfactory because of their unduly high toxicity, corrosivity and irritating properties.

At one time the quaternary ammonium salts such as an alkyldimethylbenzylammonium chloride were thought to offer a satisfactory solution to the slime control. Although attractive from the standpoint of low toxicity and corrosivity, and their ease of application, the quaternaries are often ineffective and become deactivated by various components in the processing liquid. For example, pulp liquors customarily contain large amounts of lignin and cellulosic materials, whose presence renders the quaternaries wholly ineffective at economic levels.

The art is therefore still seeking and endeavoring to find more effective slime control agents.

SUMMARY OF THE INVENTION

I have now discovered that excellent control of bacteria in water can be attained by adding thereto a bactericidal amount of a compound having the formula

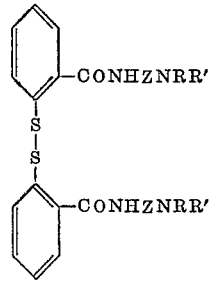

wherein each of R and R' represent lower alkyl groups of 1 to 4 carbon atoms and Z is an alkylene group of 2 to 7 carbon atoms.

DESCRIPTION OF THE INVENTION AND THE PREFERRED EMBODIMENTS

The slime controlling compounds of the invention are dithiodibenzamides wherein one hydrogen on each of the amide functions has been replaced by an N,N-di-lower-alkylaminoalkyl group. Some of the members are known compounds. They are prepared by reacting, in stoichiometric relationship, a 2,2'-dithiodibenzoyl halide with the appropriate N,N-di-lower-alkylated-alkanediamine in accordance with the following scheme

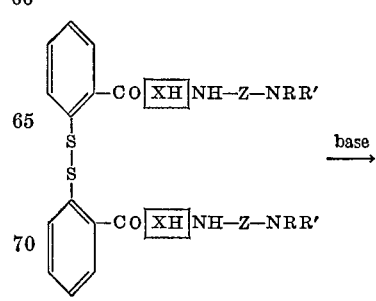

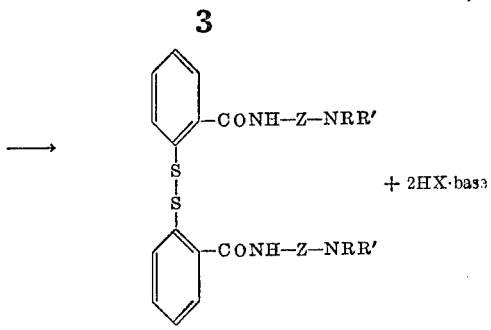

$+ 2HX \cdot base$ wherein R, R' and Z have the values aforesaid and X is a halogen, preferably chlorine.

In preparing the compounds herein, generally excellent results are obtained by combining essentially stoichiometric amounts of the reactants in the presence of a base capable of neutralizing the hydrogen halide by-product. The base is conveniently a tertiary, saturated aliphatic amine, preferably the lower members, as exemplified by trimethylamine, triethylamine, diisopropylethylamine and the like. In general, any of the usual basic hydrogen halide acceptors familiar to the art can be employed.

Since the reaction is exothermic, at least in the case of the more reactive components, it is advisable to use external cooling means. A convenient procedure is to direct a cooling jet against the outside of the reactor or flask.

While not necessary, the use of a solvent facilitates the reaction and provides better control. In general, any normally liquid organic solvent commonly employed to carry out amine/acid chloride condensations will suffice.

An especially convenient procedure for preparing the compounds herein consists of adding an ethereal solution of the dithiodibenzoyl chloride to an ethanolic solution of the basic condensing agent and the N,N-di-lower-alkyl-alkanediamine, keeping the temperature in the area of about 40° C. during the addition.

Isolation and purification of the compounds are patterned after the known organic techniques, such as distillation, crystallation, sublimation and the like. Normally the compounds are purified by crystallization from organic solvents.

Generally speaking, once given the structure of one of the particular compounds of the invention, those skilled in the art will select the particular reaction conditions which best suit their needs and requirements.

Preparation of the compounds of the invention is illustrated by the following non-limiting examples:

EXAMPLE 1

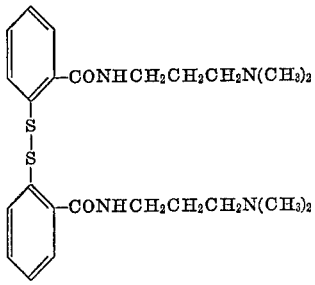

A solution of 33.0 g. of 2,2'-dithiodibenzoyl chloride in 150 ml. of tetrahydrofurane was added with stirring to a mixture of 20.0 g. of triethylamine, 20.0 g. of 3-dimethylaminopropylamine and 100 ml. of ethanol. During the addition, the temperature was maintained at about 40° C. by means of external cooling.

After the addition, the reaction mixture was filtered and the filtrate distilled in vacuo to remove the volatile components. The oily residue solidified on standing. It was crystallized from benzene giving 25.0 g. of purified product melting at 134–5° C. Chemical and instrumental analysis confirmed the structure as above depicted.

Using the procedure of Example 1, the following compounds were prepared:

EXAMPLE 2

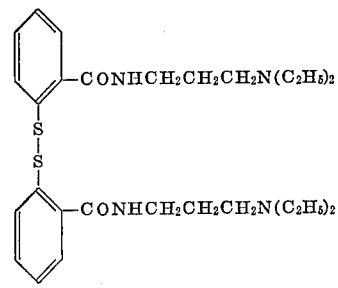

M.P. 111–113°.

EXAMPLE 3

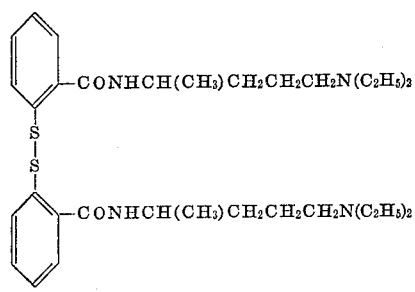

M.P. 163–164°.

EXAMPLE 4

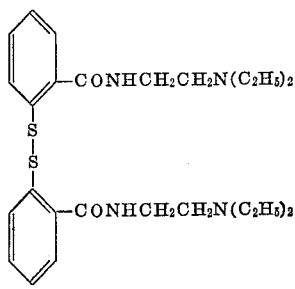

M.P. 127–130°.

EXAMPLE 5

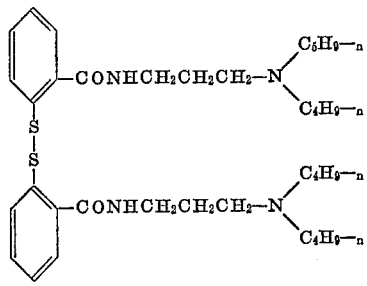

M.P. 98–100°.

The compounds of the present invention can be formulated or made up into bactericidal compositions in numerous ways, depending on circumstances under which the compositions are used. For instance, liquid bactericidal compositions can be produced by dissolving the active components of the invention in an organic solvent followed by dispersion in water, preferably in the presence of surface active agents. In some instances it may be preferable to employ this compound in the form of a solid, in which case the active agent is commonly blended with certain inert carriers, which are selected for their ability to form homogenous powders suitable for applying as a dust to the particular substrate to be protected.

In preparing the aforesaid formulations, the active component is used in amounts sufficient to exert a bactericidal effect. Satisfactory results are produced when the toxicants constitute less than 1% up to about 50% of the total weight of the composition, although in the interest of economy, low concentrations are preferred. In this connection, many factors must be considered such as the particular compound, its solubility as well as the nature of the carrier and mode of its application. These are factors to which those skilled in the bactericidal art are competent.

Although the compounds herein can be used in a solid or liquid formation, the latter is normally preferred for treatment of paper pulp liquors. In formulating such liquid bactericidal compositions, the active compound is advantageously dissolved in a suitable liquid solvent. The resulting solution can either be used as prepared or it may be conveniently diluted with water, thus forming a dispersion of the toxicant. If a water immiscible solvent is selected to effect the dissolution of the toxicant, then dispersions prepared therefrom will consist of oily droplets of dissolved toxicants, distributed throughout the aqueous medium. On the other hand, if a water miscible solution of the compound is employed and diluted with water, then the resulting dispersions will consist of minute particles of the active solid component distributed throughout the continuous aqueous phase. Typical of water immiscible solvents for use as above described are kerosene, Stoddard solvent, aromatic hydrocarbons such as xylene, toluene, and the like, and higher alcohols or alkylated naphthalenes, etc. Suitable water miscible solvents include the lower water soluble ketones as exemplified by acetone, and methylethyl ketone, certain of the lower amides, such as dimethylformamide, diethylformamide and the like, lower saturated aliphatic alcohols as typified by ethanol isopropanol, various glycol ethers, particularly Cellosolve such as methyl Cellosolve, ethyl Cellosolve and the like.

As previously mentioned, solvent solutions of the toxicant compound are designed to be used as such. However, they are commonly extended with large quantities of water to form dispersions, preferably in the presence of surface active agents, including those of the anionic, cationic or non-ionic types. Examples of these adjuncts are the sulfonated animal and vegetable oils, sulfonated petroleum oil, sodium laury sulfonate, ethylene oxide condensation products of the type produced by reacting octylphenol with ethylene oxide and the like. In general we have ascertained that excellent results ensure when the surface active agent can constitute about 1–15% by way of the composition.

In determining the bactericidal properties of the compounds herein, we have made use of the screening test procedure, the details of which are given below.

Slimicide test procedure

The test described here is designed to simulate mill conditions without introducing some of the uncontrolled variables encountered in use of actual mill pulp. One of the greatest difficulties is obtaining pulp free of germicides. Also, the variation in microbial load from one time to another can introduce an uncontrolled variable. The use of a synthetic pulp which is reasonably reproducible from test to test would seem to be justified when comparisons are to be made.

Pulp preparations.—The pulp is prepared from filter paper which is macerated in a blendor. The liquid portion is so adjusted that there will be approximately 1% solids based upon the total volume weight. To this "pulp" is added 0.25% glucose to act as a quick carbohydrate source for the test organisms and also to simulate the natural sugars residual in pulp.

After placing in suitable containers of uniform shape and size, sterilization is carried out at 15 pounds pressure for 15 minutes. Upon cooling, the test compounds are placed in the jars at the appropriate concentration and the jars are then placed on a shaking machine for an hour to allow the compounds to reach their maximum solubility. The jars are then inoculated with uniform amounts of the test organisms. The covered but unsealed test jars are then placed on the shaking machine for 24 hours after which sampling is carried out on suitable media to determine if viable organisms are still present after this exposure period.

Test as a bactericide.—Two bacteria commonly encountered in mill slimes are used,—*Aerobacter aerogenes* and *Bacillus mycoides*. The toxicant for the bactericidal test is adjusted to 1000 p.p.m. The inoculum is uniform for all test containers and consists of the introduction of approximately one million bacteria per test container. After the 24 hour shake, streaking on nutrient agar is carried out to determine if complete kill is achieved. Compounds showing inhibition at the levels indicated are tested at lower levels to obtain some idea of the critical concentration necessary for control.

Controls.—Appropriate commercial slimicides are used as controls.

When the compounds of the invention were subjected to the slimicide test procedure as above set forth, all test candidates exhibited complete kill of the bacteria below the 1000 p.p.m. level, which is the minimum virulency for a commercial slimicide. One of the compounds, Example 1, was especially effective, having been found capable of complete kill even below 100 p.p.m. This is surprising since the compound of Example 1 has been reported to be ineffective in controlling fungal type microorganisms and in this connection reference is made to F. Gialdi et al., Farmaco (Pavia) Ed. Sci. 16, 411–437 (1961).

Aside from their exceedingly effective bactericidal action, the compounds herein have such desirable ancillary properties as low corrosivity, low irritability, low cost and generally are devoid of those characteristics which make them objectionable as additives to the processing waters of a paper mill.

In addition to controlling the bacterial slime found in paper mill liquors, the broad ability of these compounds to control both gram negative and gram positive bacteria, as demonstrated by their control of mixed bacterial populations and of *Aerobacter aerogenes* and *Bacillus mycoides* specifically, can be utilized in many different types of circulatory water systems where bacterial growth is a problem. Examples of such problem areas include water systems used in power stations, in petroleum recovery, i.e. in secondary oil recovery, and in a wide range of industrial operations.

What is claimed is:

1. A method of controlling bacteria in pulp liquors by adding thereto a bactericidal amount of a compound of the formula

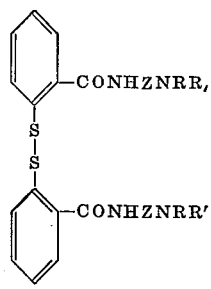

wherein each of R and R' represents lower alkyl of 1 to 4 carbon atoms and Z is an alkylene group of 2 to 7 carbon atoms, and wherein each ZNRR' is the same, said compound being used in combination with a carrier therefor.

2. A process according to claim 1 wherein the compound has the formula

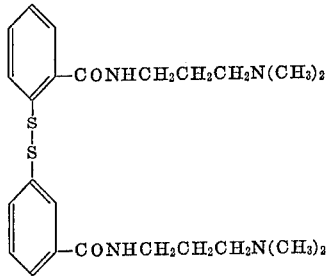

3. A process according to claim 1 wherein the compound has the formula

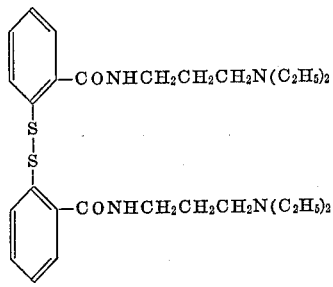

4. A process according to claim 1 wherein the compound has the formula

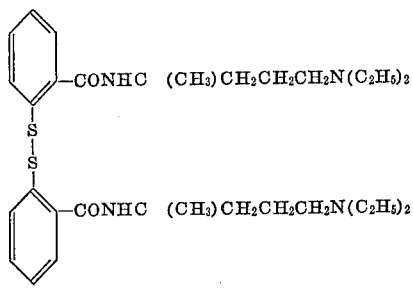

5. A process according to claim 1 wherein the compound has the formula

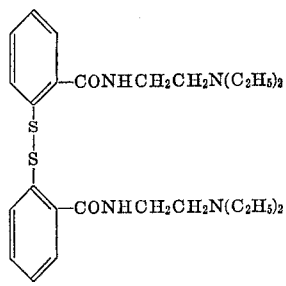

6. A process according to claim 1 wherein the compound has the formula

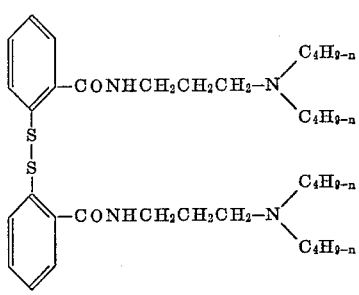

References Cited

F. Gialdi et al., Farmaco (Pauia) Ed. Soi. 16, 411–437 (1961).

ALBERT T. MEYERS, Primary Examiner

L. SCHENKMAN, Assistant Examiner

U.S. Cl. X.R.

260—558

UNITED STATES PATENT OFFICE
CERTIFICATE OF CORRECTION

Patent No. 3,574,858          Dated April 13, 1971

Inventor(s) Gert P. Volpp

It is certified that error appears in the above-identified patent and that said Letters Patent are hereby corrected as shown below:

Column 4, Example 5, that portion of the formula reading $C_5H_9-_n$ should read $C_4H_9-_n$.

Column 5, line 45, "laury" should read --lauryl--.

Column 7, claim 4, that portion of the formula reading $CONHC(CH_3)CH_2CH_2CH_2N(C_2H_5)_2$ should read
$CONHCH(CH_3)CH_2CH_2CH_2N(C_2H_5)_2$ Signed and sealed this 2nd day of May 1972.

(SEAL)
Attest:

EDWARD M. FLETCHER, JR.                ROBERT GOTTSCHALK
Attesting Officer                      Commissioner of Patents